(12) United States Patent
Wolf et al.

(10) Patent No.: US 6,599,633 B1
(45) Date of Patent: Jul. 29, 2003

(54) ORGANOSILOXANE COMPOSITIONS

(75) Inventors: Andreas Wolf, Braine-l'alleud (BE); Andreas Stammer, Nivelles (BE); Robert Dandois, Marbais (BE)

(73) Assignee: Dow Corning S.A., Seneffe (BE)

( * ) Notice: Subject to any disclaimer, the term of this patent is extended or adjusted under 35 U.S.C. 154(b) by 0 days.

(21) Appl. No.: 09/958,435

(22) PCT Filed: Apr. 4, 2000

(86) PCT No.: PCT/EP00/02919
§ 371 (c)(1),
(2), (4) Date: Oct. 9, 2001

(87) PCT Pub. No.: WO00/61672
PCT Pub. Date: Oct. 19, 2000

(30) Foreign Application Priority Data

Apr. 10, 1999 (GB) .............................................. 9908302

(51) Int. Cl.⁷ .......................... C08K 5/01; C08K 5/3417
(52) U.S. Cl. ............................ 428/447; 528/34; 524/91; 524/588; 524/715; 524/863
(58) Field of Search .......................... 524/588, 91, 715, 524/863; 528/34; 428/447

(56) References Cited

U.S. PATENT DOCUMENTS

| 3,189,615 A | | 6/1965 | Heller et al. |
| 4,312,801 A | * | 1/1982 | Hiriart Bodin et al. . 260/31.2 R |
| 5,635,544 A | * | 6/1997 | Tamura et al. ................ 522/79 |

FOREIGN PATENT DOCUMENTS

| EP | 842 974 | * | 5/1998 |
| GB | 2291658 | | 1/1996 |

* cited by examiner

Primary Examiner—Margaret G. Moore
(74) Attorney, Agent, or Firm—McKellar Stevens; Robert L. McKellar

(57) ABSTRACT

A silicone composition comprising a polymer having siloxane units and two or more silicon bonded hydroxyl or hydrolyzable groups per molecule; a crosslinker; an extender material which is either an alkyl substituted aryl compound such as a heavy alkylate, or a alkylcycloaliphatic compound; and a u.v. light stabilizer comprising a benzotriazole moiety. These compositions are useful, for example as room temperature vulcanizable sealants. They retain color clarity or transparency, even on ageing.

21 Claims, No Drawings

ORGANOSILOXANE COMPOSITIONS

This invention is concerned with organosiloxane compositions which are curable to elastomers and which have good resistance to yellowing and other ageing effects. These compositions are useful for example as sealing materials.

Organosiloxane compositions which cure to elastomeric solids are well known. Typically such compositions are obtained by mixing a polydiorganosiloxane (for example a polydimethylsiloxane) having reactive terminal groups, generally silanol groups, with a silane cross-linking agent for the polydiorganosiloxane, for example an alkoxy silane, an acetoxy silane or oximo silane, a filler and usually also a curing catalyst. These compositions are frequently single part compositions curable upon exposure to atmospheric moisture at room temperature or two part compositions curable upon mixing under room conditions.

One important application of the above-described curable compositions is their use as sealants. In use as a sealant, it is important that the composition has a blend of properties which render it capable of application as a paste to a joint between substrate surfaces where it can be worked, prior to curing, to provide a smooth surfaced mass which will remain in its allotted position until it has become cured to an elastomeric body adherent to the adjacent substrate surfaces. It is frequently desirable that the composition cures quickly enough to provide a sound seal within several hours but not so quickly that the surfaces cannot be tooled to desired configuration shortly after application. The cured composition should have a strength and elasticity appropriate for the particular joint concerned.

Within the group of pigmented silicone sealants, various inactive or reinforcing fillers, such as calcium carbonates, talc, glass microspheres or PVC powder may be included. These can act as reinforcing fillers and reduce the formulation cost. However, where a clear or transparent formulation is required, these fillers are not suitable and fine particle size silicas such as fumed silicas may be employed as the reinforcing filler.

Generally speaking, those compositions which are required to demonstrate thixotropic properties prior to cure and higher tensile and tear strength properties when cured employ larger quantities of the reinforcing fillers. The silicas are generally employed in those compositions which are intended to be transparent or at least substantially so whereas the calcium carbonates are often employed in compositions where transparency is less required and pigment is used instead.

It is also a common practice in the formulation of silicone based sealants to incorporate a material which serves as a plasticiser for the composition. Commonly the trimethylsilyl terminated polydiorganosiloxanes (for example trimethylsilyl terminated polydimethyl siloxane (PDMS)) are used for this purpose. Whilst they are effective at the time of application of the sealant and subsequently, at least for a time, sometimes they exude from the sealant over time and may give rise to staining of the surrounding substrates onto which the material bleeds.

A number of organic materials have been considered in the past as extenders or fillers with a view to reducing the cost of the silicone sealant compositions. These materials are generally classified into two groups. The first group are high volatility solvents and the resulting sealants are generally referred to as diluted sealants. Examples of suitable solvents are toluene or xylene. The high volatility of these solvents causes a number of disadvantages in diluted sealants, such as high shrinkage (high volume loss due to evaporation of the solvent), flammability, VOC (volatile organic content), hazardous component labelling, health and safety issues, etc.

The second group are those low volatility solvents or lower molecular weight plasticizers, which have good compatibility with the polydiorganosiloxane having reactive groups. The resulting sealants are termed "extended" sealants and generally show much more acceptable properties than diluted sealants. The solvents or lower molecular weight plasticizers can completely or partially replace the PDMS plasticizer in the formulation.

A number of extenders are well known in the literature. Examples are low molecular weight polyisobutylene (PIB), phosphate esters, mineral oil fractions (e.g. isoparaffines), polyalkylbenzenes and in particular, heavy alkylates. The expression "heavy alkylates" refers to the alkylated aromatic materials remaining after distillation of oil in a refinery. The alkylbenzene extenders such as the heavy alkylates offer an especially attractive combination of properties, i.e. high boiling points, excellent compatibility with the polydiorganosiloxane polymer matrix (resulting in cured silicone sealants of good to excellent transparency), low environmental impact, low vapour pressure (and therefore low shrinkage), positive effect on the rheological properties (reduced stringing), etc.

The fact that these extenders give rise to highly transparent (i.e. glass clear) sealants is particularly useful. Silicone sealants which are highly transparent previously required careful matching of the refractive indices of the polymer and fumed silica used as a filler. This had generally been achieved by inclusion of phenyl substituted siloxanes in the formulation, or, more effectively, by using phenyl-substituted copolymers in the formulation. Both of these options however, increase the cost of the formulation. Thus the use of an alkyl benzene extender as described above, provides a much cheaper way of obtaining transparency.

However, when exposed to artificial or natural weathering, alkyl benzene extended sealants tend to yellow rather rapidly. Over prolonged weathering, these extended sealants continue to yellow, and also lose their transparency. This problem does not occur with other extenders, such as phosphate esters or polyisobutylene.

The applicants have found a way to minimise these problems with the sealants using these advantageous extenders.

The present invention provides silicone composition comprising a polymer having siloxane units and two or more silicon bonded hydroxyl or hydrolysable groups per molecule, a crosslinker, an extender material which comprises either an alkyl substituted aryl compound or an alkylcycloaliphatic compound, and a u.v. light stabiliser comprising a benzotriazole moiety.

Using the formulation of the invention, the problem of discoloration of extended silicone sealants upon weathering has been alleviated, and where transparent compositions are produced, a substantially stable transparency with ageing has been achieved.

The retention of transparency noted with certain compositions of the invention is particularly surprising since it would be expected that loss of clarity with weathering is due to the evaporation of the alkylbenzene extender, and indeed, this loss can be monitored by measuring weight loss of samples with time. The addition of the benzotriazole has no impact on the evaporation rate and yet the advantageous property (transparency) arising from the addition of alkylbenzene is retained nonetheless.

The concept of "comprising" where used herein is used in its widest sense to mean and to encompass the notions of "include" and "consist of".

U.V light stabilising compounds which include a benzotriazole group are known in the art. Examples of suitable u.v. light stabilisers are u.v. light stablilising compounds of general formula (I)

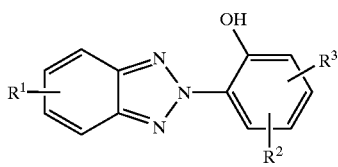

where $R^1$ is hydrogen or a substituent group, $R^2$ and $R^3$ are independently selected from hydrogen or a substituent.

Examples of suitable substituents for $R^1$ include a lower alkyl ester of a carboxylic acid, an ethyl sulphonyl group, chloro, lower alkoxy. In particular $R^1$ is hydrogen or chloro.

Where $R^1$ is other than hydrogen, it is suitably located at the 5-position of the ring.

Examples of suitable substituents for $R^2$ and $R^3$ include optionally substituted alkyl, lower alkoxy, lower carbalkoxy, cyclohexyl, phenyl and chlorine. Suitable optional substituents for alkyl groups $R^2$ and $R^3$ include phenyl or a group —CO—O—$C_{1-18}$ alkyl which alkyl moiety is optionally substituted by a hydroxy group and is optionally interrupted by one or two oxygen atoms.

In particular, $R^2$ and $R^3$ are alkyl groups such as methyl, tert-butyl or dodecyl. Where $R^2$ and/or $R^3$ are other than hydrogen, they are suitably arranged at the 4 and/or 6 positions of the phenol ring.

The expression "alkyl" as used herein refers to straight or branched chains having from 1–30, suitably from 1–12 carbon atoms. Similarly alkoxy groups will comprise an alkyl group of this nature but linked via an oxygen atom. As used herein, the expression "lower" when used in relation to alkyl or alkoxy groups includes groups having from 1 to 4 carbon atoms. The term "hydrocarbyl" or "hydrocarbon" as used herein includes alkyl; cycloalkyl; alkenyl; alkynyl; aryl optionally substituted with alkyl; or aralkyl groups. Alkenyl and alkynyl groups suitably contain from 2 to 20 carbon atoms and may be straight or branched. Aryl groups include phenyl and naphthyl groups. An example of an alkyl substituted aryl group is tolyl. Aralkyl groups include for example benzyl and phenylethyl. The term "hydrocarbyl" or "hydrocarbon" as used herein is intended to cover organic groups made up of carbon and hydrogen and having for example up to 50 but suitably up to 20 carbon atoms. This term encompasses alkyl, cycloalkyl, alkenyl, cycloalkenyl, alkynyl, cycloalkynyl, aryl, aralkyl and alkyl substituted aryl groups such as tolyl.

Thus particular examples of compounds of formula (I) are compounds of formula (IA)

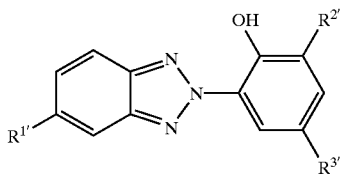

where $R^{1'}$ is hydrogen or chlorine, $R^{2'}$ is hydrogen or a $C_{4-30}$ alkyl group, and $R^{3'}$ is a $C_{1-5}$ alkyl group, optionally substituted by phenyl or optionally substituted by a group— CO—O—$C_{1-18}$ alkyl which is optionally substituted by a hydroxy group and is optionally interrupted by one or two oxygen atoms.

Examples of such compounds are those described in U.S. Pat. No. 3,189,615, WO 98/46342 or benzotriazole UVA compounds described in GB-2291658A, the content of which is incorporated by reference, as well as 2-(2H-benzotriazol-2-yl)-6-dodecyl-4-methylphenol and 2,4-di-tert-butyl-6-(5-chlorobenzotriazol-2-yl) phenol (available from Ciba Geigy as Tinuvin™ 571 and Tinuvin™ 327 respectively).

The amount of benzotriazole stabiliser present in the composition will depend upon the precise nature of the composition and in particular the amount of extender present. However, amounts of from 0.01 to 2 parts by weight, preferably from 0.05 to 0.5 parts by weight and most preferably from 0.1 to 0.3 parts by weight of the stabiliser will be sufficient.

In a composition according to the invention, the hydroxyl bearing polysiloxane may have the general formula $$X—A—X^1 \tag{II}$$

where X and $X^1$ are independently selected from siloxane groups which terminate in hydroxyl or hydrolysable groups and A is a siloxane molecular chain.

Examples of hydroxyl-terminating or hydrolysable groups X or $X^1$ include —SiOH, —$(R^a)_2$SiOH, —$R^a$Si$(OR^b)_2$, —Si$(OR^b)_3$, —$R^a{}_2$SiO$R^b$ or —$R^a$Si$R^c$Si$R^d{}_p(OR^2)_{3-p}$ where each $R^a$ independently represents a monovalent hydrocarbyl group, for example, an alkyl group, in particular having from 1 to 8 carbon atoms, (and is preferably methyl); each $R^b$ and $R^d$ group is independently an alkyl or alkoxy group in which the alkyl groups suitably have up to 6 carbon atoms; $R^c$ is a divalent hydrocarbon group which may be interrupted by one or more siloxane spacers having up to six silicon atoms; and p has the value 0, 1 or 2.

Suitably, X and/or $X^1$ are groups which hydrolyse in the presence of moisture.

Examples of suitable groups A in formula (I) are those which comprise a polydiorgano-siloxane chain. Thus group A preferably includes siloxane units of formula (III)

$$—(R^5{}_sSiO_{(4-s)/2})— \tag{III}$$

in which each $R^5$ is independently an organic group such as a hydrocarbyl group having from 1 to 10 carbon atoms optionally substituted with one or more halogen group such as chlorine or fluorine and S is 0, 1 or 2. Particular examples of groups $R^5$ include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group.

Suitably, at least some and preferably substantially all of the groups $R^5$ are methyl. The group A in the compound of formula (II) may include up to 2000 units of formula (III), suitably from 200–1500 such units.

Preferred materials are linear materials i.e. S=2 for all chain units. Preferred materials have polydiorgano-siloxane chains according to the general formula (V)

$$—(R^5{}_2SiO)_t— \tag{V}$$

in which each $R^5$ is as defined above and is preferably a methyl group and t has a value from about 200 to about 1500. Suitable materials have viscosities of the order of about 100 mPa.s to about 300,000 mPa.s.

Preferred polysiloxanes of formula (II) are thus polydiorganosiloxanes having terminal, silicon-bound hydroxyl groups or terminal, silicon-bound organic radicals which can be hydrolysed using moisture. These polydiorganosiloxanes preferably have a viscosity of 0.5 to 200 Pa.s at 25° C. The polydiorganosiloxanes may be homopolymers or copolymers. Mixtures of different polydiorganosiloxanes having terminal condensable groups are also suitable.

The crosslinker used in the composition of the invention is suitably a silicon compound containing hydrolysable groups. These include one or more silanes or siloxanes which contain silicon bonded hydrolysable groups such as acyloxy groups (for example, acetoxy, octanoyloxy, and benzoyloxy groups); ketoximino groups (for example dimethyl ketoximo, and isobutylketoximino); alkoxy groups (for example methoxy, ethoxy, an propoxy) and alkenyloxy groups (for example isopropenyloxy and 1-ethyl-2-methylvinyloxy). A particularly preferred class of crosslinker for use in the compositions of the invention are acyloxy groups such as acetoxy.

In the case of siloxanes the molecular structure can be straight chained, branched, or cyclic.

The crosslinker suitably has three or more silicon-bonded hydrolysable groups per molecule. When the crosslinker is a silane and when the silane has three silicon-bonded hydrolysable groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably however, the fourth silicon-bonded organic groups is methyl.

Silanes and siloxanes which can be used as crosslinkers include methyltrimethoxysilane, methyltriethoxysilane, vinyltrimethoxysilane, vinyltriethoxysilane, methylphenyldimethoxysilane, 3,3,3-trifluoropropyltrimethoxysilane, methyltriacetoxysilane, vinyltriacetoxysilane, ethyl triacetoxysilane, di-butoxy diacetoxysilane, phenyl-tripropionoxysilane, methyltris(methylethylketoximo)silane, vinyl-tris-methylethylketoximo)silane, methyltris(methylethylketoximino)silane, methyltris(isopropenoxy)silane, vinyltris(isopropenoxy)silane, ethylpolysilicate, n-propylorthosilicate, ethylorthosilicate, dimethyltetraacetoxydisiloxane, and mixtures thereof.

Of these, the acetoxy compounds, methyltriacetoxysilane, vinyltriacetoxysilane, ethyl triacetoxysilane, di-butoxy diacetoxysilane, dimethyltetraacetoxydisiloxane, and mixtures thereof are preferred.

The amount of crosslinker present in the composition will depend upon the particular nature of the crosslinker and in particular, the molecular weight of the molecule selected. The compositions suitably contain crosslinker in at least a stoichiometric amount as compared to the polymeric material described above. Compositions may contain, for example, from 3–30% w/w of crosslinker, but generally from 3–10% w/w. Acetoxy crosslinkers may typically be present in amounts of from 3–5% w/w whilst oximino cross-linkers, which have generally higher molecular weights will typically comprise from 4–7% w/w.

The compositions of the invention include an extender compound which is an alkyl substituted aryl compound such as a heavy alkylate alkylbenzene or a alkylcycloaliphatic compound. Examples of alkyl substituted aryl compounds useful as extenders are compounds which have aryl groups, especially benzene substituted by alkyl and possibly other substituents, and a molecular weight of at least 200. Examples of such extenders are shown in U.S. Pat. No. 4,312,801, the content of which is incorporated herein by reference. These compounds can be represented by general formula (VI), (VII), (VIII) and (IX)

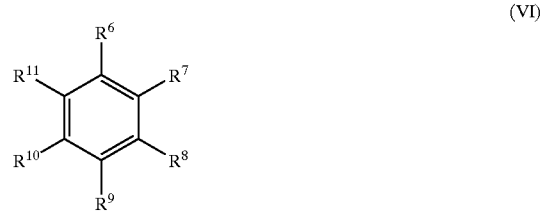

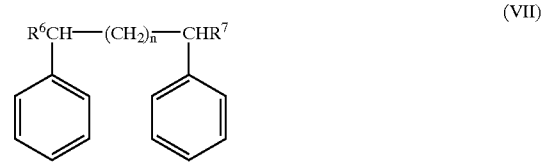

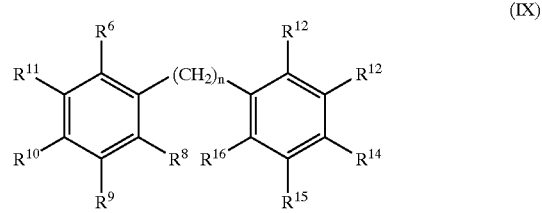

where $R^6$ is an alkyl chain of from 1 to 30 carbon atoms, each of $R^7$ through to $R^{16}$ is independently selected from hydrogen, alkyl, alkenyl, alkynyl, halogen, haloalkyl, nitrile, amine, amide, an ether such as an alkyl ether or an ester such as an alkyl ester group, and n is an integer of from 1 to 25.

In particular, the extender used in the composition of the invention is of formula (VI) where each of $R^7$, $R^8$, $R^9$, $R^{10}$ and $R^{11}$ is hydrogen and $R^6$ is a $C_{10}$–$C_{13}$ alkyl group.

A particularly useful source of such compounds are the so-called "heavy alkylates", which are recoverable from oil refineries after oil distillation. Generally distillation takes place at temperatures in the range of from 230–330° C., and the heavy alkylates are present in the fraction remaining after the lighter fractions have been distilled off.

Examples of alkylcycloaliphatic compounds are substituted cyclohexanes with a molecular weight in excess of 220. Examples of such compounds are described in European Patent Application No. 842974, the content of which is incorporated herein by reference. Such compounds may be represented by general formula (X).

where $R^{17}$ is a straight or branched alkyl group of from 1 to 25 carbon atoms, and $R^{18}$ and $R^{19}$ are independently selected from hydrogen or a $C_{1-25}$ straight or branched chain alkyl group.

The amount of extender which may be included in the composition will depend upon factors such as the purpose to which the composition is to be put, the molecular weight of the extender etc. Compositions may contain up to 70% w/w extender depending upon these factors. In general however, the higher the molecular weight of the extender, the less will be tolerated in the composition. Typical compositions will contain up to 60% w/w extender. More suitable compositions comprise from 30–35% w/w of a linear extender whereas 20–25% w/w will be more preferred when the extender is a heavy alkylate.

Suitably, the composition further comprises a condensation catalyst. This increases the speed at which the composition cures. The catalyst chosen for inclusion in a particular silicone sealant composition depends upon the speed of cure required. Silicone sealant compositions which contain oximosilanes or acetoxysilanes generally use a tin catalyst for curing, especially diorganotin dicarboxylate compounds such as dibutyltin dilaurate, dibutyltin diacetate, dimethyltin bisneodecanoate. For compositions which include alkoxysilane crosslinker compounds, the preferred curing catalysts are titanium compounds such as tetrabutyltitanate, tetraisopropyltitanate, diisopropyl bis(acetylacetonyl) titanate, diisopropyl bis(ethylacetoacetonyl)titanate and the like.

Compositions of this invention may contain as optional constituents other ingredients which are conventional to the formulation of silicone rubber sealants and the like. For example, the compositions will normally contain one or more finely divided, reinforcing fillers as discussed above, or additional extending fillers such as high surface area fumed and precipitated silicas, crushed quartz, diatomaceous earths, calcium carbonate, barium sulphate, iron oxide, titanium dioxide and carbon black. The proportion of such filler employed will depend on the properties desired in the elastomer-forming composition and the cured elastomer. Usually the filler content of the composition will reside within the range from about 5 to about 150 parts by weight per 100 parts by weight of the polymeric material.

Other ingredients which may be included in the compositions are co-catalysts for accelerating the cure of the composition, pigments, plasticisers, agents (usually organosilicon compounds) for treating fillers, rheological additives for improving toolability of the composition and adhesion improving substances for example γ-aminopropyl triethoxysilane. Suitable co-catalysts are well known in the art and include the metal salts of carboxylic acids and amines. Another conventional ingredient which can be employed as a plasticiser and to reduce the modulus of the cured elastomer is a polydimethyl siloxane having terminal triorganosiloxy groups wherein the organic substituents are e.g. methyl, vinyl or phenyl or combinations of these groups. Such polydimethylsiloxanes normally have a viscosity of from about 10 to about 1,000 mPa.s at 25° C. and can be employed in amounts up to about 80 parts per 100 parts by weight of the polymeric material. The compositions are preferably room temperature vulcanisable compositions in that they cure at room temperature without heating.

In a further aspect, the invention provides a method of preparing a composition as described above, which essentially comprises mixing together a siloxane polymer having hydroxyl or hydrolysable groups and a crosslinker, and thereafter dispersing the extender and the stabiliser in the mixture.

Examples can be prepared by mixing the ingredients employing any suitable mixing equipment. Other components may be added as necessary. For example preferred one part, moisture curable compositions may be made by mixing together the polysiloxane having hydroxyl or hydrolysable groups and any organosilicon plasticiser or filler used, and mixing this with a pre-mix of the crosslinker and catalyst. The extender and the stabiliser may then be dispersed in this mixture. Pigments and minor additives may be added to the mixture at any desired stage, and this is preferably done as near the end of the mixing procedure as possible.

After mixing, the compositions may be stored under substantially anhydrous conditions, for example in sealed containers, until required for use.

Compositions according to the invention may be formulated as single part formulations which are stable in storage but cure on exposure to atmospheric moisture and may be employed in a variety of applications, for example as coating, caulking and encapsulating materials. They are, however, particularly suitable for sealing joints, cavities and other spaces in articles and structures which are subject to relative movement. They are thus particularly suitable as glazing sealants and for sealing building structures where the visual appearance of the sealant is important.

Thus in a further aspect, the invention provides a method of sealing a space between two units, said method comprising applying a composition as described above and causing or allowing the composition to cure. Suitable units include glazing structures or building units as described above and these form a further aspect of the invention.

The invention will now be particularly described by way of Example.

EXAMPLE 1

Formulation for Acetoxy Sealant

The following materials were used in the preparation of a sealant mix.

| Material | Function | Amount wt % |
| --- | --- | --- |
| Dimethyl Siloxane, Hydroxy-terminated; Viscosity 16500 Centipoise | Base polymer | 87.6 |
| Mixture of methyltriacetoxysilane and ethyltriacetoxysilane | Crosslinker | 3.79 |
| Fumed silica | Filler | 8.6 |
| Dibutyl tin salt | Catalyst | 0.01 |

The product was made by premixing the cross-linker and catalyst. The silica was then mixed with the base polymer and then with the premix. The composition was then devolatised and packaged. During manufacture and storage the hydroxyl groups of the base polymer and on the silica filler react with the acetoxy functional crosslinker and there was some hydrolysis of acetoxysilanes as indicated by traces of moisture present in the formulation.

EXAMPLE 2

Preparation and Testing of Sealant Formulation

To acetoxy sealant (16 g) of Example 1, an alkylcyclohexane sold under the trade name HP 900, by Petresa, Spain (4 g) was added and mixed in a Hausschild dental mixer. A sheet of 2 mm thickness was prepared and cured for one week. A second sample of the acetoxy sealant (16 g), the same HP900 alkylcyclohexane (4 g) and 60 mg Tinuvin™ 328 UV stabiliser was prepared. Both sheets were placed in the QUV (UV only). After 4 weeks the unprotected sample was opaque (total loss of translucency) while the Tinuvin™ 328 containing sample remained clear.

EXAMPLE 3

Preparation of Samples and Short Term Stability Testing

Using the methodology of Examples 1 and 2 above, a range of sealant formulations were prepared with a range of extenders and with and without a variety of u.v. stabilising compounds. The extenders used are summarised in Table 1 below whilst the stabilisers are listed in Table 2.

TABLE 1

| Ref | Supplier | Product Name | Chemical Description |
|---|---|---|---|
| $II_A$ | Janex S.A. | HAL 17 | Heavy alkylate - long chain alkylbenzene |
| $II_B$ | | HAL 41 | Linear alkylbenzenes (C10–C13) |
| $II_C$ | | HAL 47 | Heavy alkylate - branched alkylbenzenes |
| $II_D$ | Petresa N.V. | P-550 | Linear alkylbenzenes C10–C13) |
| $II_E$ | | P-550-Q | Linear alkylbenzenes (C10–C13) |
| $II_F$ | | P-585-Q | Linear alkylbenzenes (C10–C13) |
| $II_G$ | | P-900 | Heavy alkylate - long chain alkylbenzene |
| $II_H$ | Wibarco (BASF) | Wibarcan | Linear alkylbenzenes (C10–C13) |
| $II_J$ | Kettlitz GmbH | Mediaplast EP-P | Branched alkylbenzene |
| $II_K$ | Petresa N.V. | HP 900 | Fully hydrogenated heavy alkylate (alkylcyclohexane) |
| $II_L$ | Petresa N.V. | P 900 MH | Mildly hydrogenated heavy alkylate |

TABLE 2

UV Stabilisers

| | Supplier | Product Name | Chemical Name |
|---|---|---|---|
| $III_A$ | Ciba-Geigy | Tinuvin ™ 292 | Mixture of methyl-and bis-(1,2,2,6,6-pentamethyl-4-piperidyl) sebacate |
| $III_B$ | | Tinuvin ™ 327 | 2,4-di-tert-butyl-6- (5-chlorobenzotriazol-2-yl) phenol |
| $III_C$ | | Tinuvin ™ 328 | 2-H2H-benzotriazol-2-yl)-4,6-ditertpentylphenol |
| $III_D$ | | Tinuvin ™ 571 | 2-(2H-benzotriazol-2-yl)-6-6dodecyl-4-methylphenol |
| $III_E$ | | Irganox ™ 1010 | Pentaerythritol tetrakis(3-(3,5-di-tert-butyl-4-hydroxyphenyl) propionate) |

Cured samples of extended sealants, approx. 25 mm×50 mm×3 mm in size, were submitted for one week to continuous, intense UV radiation in a Q-U-V Accelerated Weather Tester (dry conditions, no moisture condensation).

In order to quantify the yellowing, ratings were assessed visually on a scale of from 0 to 10. Samples typical of the different ratings were submitted to a Minolta CR-200 colourmeter to obtain their L.a.b colour parameters (see CIE 1976 Uniform Colour Space and Colour-Difference Equation and ASTM D2244-93 standard "Standard test method for calculation of colour differences from instrumentally measure colour co-ordinates).

Table 4 gives the relation between ratings and L.a.b. parameters together with a brief colour description. The results for the various formulations are shown in Table 3.

TABLE 3

Results from the UV stability study (short term)

| Sealant | Extender | | UV Stabiliser | | Yellowness Rating | |
|---|---|---|---|---|---|---|
| level(%) | type | level(%) | type | level(%) | with UV stabiliser | w/out UV stabiliser |
| 94.9 | $II_A$ | 5 | $III_C$ | 0.1 | 6 | 7 |
| 89.9 | $II_A$ | 10 | $III_C$ | 0.1 | 7 | 9 |
| 849 | $II_A$ | 15 | $III_C$ | 0.1 | 8 | 10 |
| 94.8 | $II_A$ | 5 | $III_C$ | 0.2 | 6 | 7 |
| 89.8 | $II_A$ | 10 | $III_C$ | 0.2 | 7 | 9 |
| 84.8 | $II_A$ | 15 | $III_C$ | 0.2 | 8 | 10 |
| 94.7 | $II_A$ | 5 | $III_C$ | 0.3 | 5 | 7 |
| 89.7 | $II_A$ | 10 | $III_C$ | 0.3 | 7 | 9 |
| 84.7 | $II_A$ | 15 | $III_C$ | 0.3 | 8 | 10 |
| 84.9 | $II_A$ | 15 | $III_C$ | 0.1 | 6 | 7 |
| 84.9 | $II_A$ | 15 | $III_B$ | 0.1 | 10 | 10 |
| 84.9 | $II_B$ | 15 | $III_C$ | 0.1 | 1 | 3 |
| 79.7 | $II_C$ | 20 | $III_A$ | 0.3 | 4 | 3✓ |
| 84.9 | $II_C$ | 15 | $III_C$ | 0.1 | 3 | 4 |
| 84.9 | $II_D$ | 15 | $III_C$ | 0.1 | 1 | 3 |
| 84.9 | $II_E$ | 15 | $III_C$ | 0.1 | 1 | 1 |
| 84.9 | $II_F$ | 15 | $III_C$ | 0.1 | 1 | 2 |
| 84.9 | $II_G$ | 15 | $III_C$ | 0.1 | 7 | 9 |
| 84.9 | $II_H$ | 15 | $III_C$ | 0.1 | 4 | 9 |
| 79.9 | $II_J$ | 20 | $III_B$ | 0.1 | 1 | 4 |
| 79.9 | $II_J$ | 20 | $III_C$ | 0.1 | 1 | 4 |
| 79.9 | $II_J$ | 20 | $III_D$ | 0.1 | 1 | 4 |
| 80 | $II_L$ | 19.7 | $III_C$ | 0.3 | 1 | 10 |

TABLE 4

Ratings used in the UV stability study

| | | L.a.b parameters | | |
|---|---|---|---|---|
| Rating | Colour description | L | a | b |
| 0 | Transparent, clear | 76.7 | 1.0 | 2.7 |
| 1 | Transparent, very slight yellow colour | 70.8 | 1.1 | 5.5 |
| 2 | Transparent, pale yellow | 68.8 | 0.9 | 6.2 |
| 3 | Transparent, pale yellow | 69.6 | 0.6 | 7.7 |
| 4 | Transparent, yellow | 70.8 | 0.5 | 12.4 |
| 5 | Transparent, yellow | 68.3 | −0.2 | 15.8 |
| 6 | Transparent, yellow | 72.2 | −1.0 | 18.1 |
| 7 | Transparent, dark yellow | 65.1 | −0.5 | 26.4 |
| 8 | Some opaqueness, dark yellow | 66.1 | 0.7 | 34.9 |
| 9 | Opaque, orange yellow | 59.4 | 1.9 | 31.3 |
| 10 | Opaque, brownish yellow | 60.2 | 4.4 | 36.9 |

As can be seen, UV stabilisers $III_B$, $III_C$ and $III_D$ (Tinuvin™ 327, 328 and 571) all benzotriazole stabilisers, are effective in protecting the extended sealant from yellowing: the average rating of protected samples is approx. two points lower than the average rating of unprotected samples—this is a significant and very visible difference. The UV stabiliser $III_A$ (Tinuvin™ 292, a substituted sebacate) and $III_E$ (Irganox™ 1010, a pentaerythritol derivative) do not provide any improvement in UV resistance. In this trial, addition of stabiliser $III_A$ to the extended silicone sealant formulation resulted in a stronger discoloration with UV ageing.

For the mildly hydrogenated heavy alkylate (P900MH) the Tinuvin™ 328 provided complete protection in the short term testing. This means that this experimental product allows, for the first time the formulation of low cost, water clear silicone sealants of low volatility that show no initial colour and do not discolour under UV radiation.

EXAMPLE 4

Long Term Stability Study

In a second experiment, various cured samples of extended sealants, approx. 25 mm×50 mm×3 mm in size, were submitted for 20 weeks (=3.300 hours) of continuous intense UV radiation in a Q-U-V Accelerated Weathering Tester (dry conditions, no moisture condensation). The results are shown in Table 5.

TABLE 5

Results from the UV Stability study (long term)

| Sealant | Extender | | UV Stabiliser | | Yellow-ness Rating | Opaqueness Transmit-tance, % |
|---|---|---|---|---|---|---|
| level(%) | type | level(%) | type | level(%) | | |
| 90.9 | II$_C$ | 9.1 | None | — | 3 | 53 |
| 87.0 | II$_C$ | 13.0 | None | — | 3–4 | 36 |
| 83.3 | II$_C$ | 16.7 | None | — | 4 | 27 |
| 90.8 | II$_C$ | 9.1 | III$_B$ | 0.1 | 3 | 64 |
| 86.9 | II$_C$ | 13.0 | III$_B$ | 0.1 | 3 | 56 |
| 83.2 | II$_C$ | 16.7 | III$_B$ | 0.1 | 3 | 59 |
| 90.7 | II$_C$ | 9.1 | III$_B$ | 0.2 | 3 | 55 |
| 58.8 | II$_C$ | 13.0 | III$_B$ | 0.2 | 3 | 68 |
| 83.1 | II$_C$ | 16.7 | III$_B$ | 0.2 | 3 | 59 |
| 90.6 | II$_C$ | 9.1 | III$_B$ | 0.3 | 3 | 59 |
| 86.7 | II$_C$ | 13.0 | III$_B$ | 0.3 | 3–4 | 57 |
| 83.0 | II$_C$ | 16.7 | III$_B$ | 0.3 | 3–4 | 60 |

While some differences were observed in the discoloration of these samples, the unprotected samples became significantly more opaque with UV exposure than the ones containing UV light stabilisers. Opaqueness was assessed by measuring light transmittance through the samples, using a Minolta CT-210 colour-meter.

Again, the difference in transmittance as measured on the unprotected samples is significant and quite visible, while the transmittance of all protected samples remains essentially unaltered by the UV exposure (measured transmittance in the 55–64% range).

What is claimed is:

1. A silicone composition comprising (i) a polymer having siloxane units and at least two silicon bonded groups per polymer molecule, the silicon bonded groups being selected from the group consisting of hydroxyl and hydrolysable groups, (ii) a crosslinker and (iii) an extender material comprising a compound selected from the group consisting of alkyl substituted aryl compounds and alkylcycloaliphatic compounds, characterised in that the said silicone composition further comprises a u.v. light stabiliser comprising a benzotriazole moiety.

2. The composition according to claim 1, wherein the said u.v. light stabiliser is a compound of formula (I)

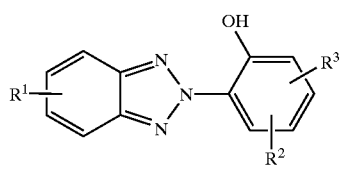

(I)

where $R^1$ is selected from the group consisting of hydrogen and organic substituent groups and $R^2$ and $R^3$ are independently selected from the group consisting of hydrogen and organic substituent groups.

3. The composition according to claim 2, wherein the said compound of formula (I) is 2-(2H-benzotriazol-2-yl)-6-dodecyl-4-methylphenol.

4. The composition according to claim 2, wherein the said compound of formula (I) is 2,4-di-tert-butyl-6-(5-chlorobenzotriazol-2-yl)phenol.

5. The composition according to claim 1, which contains from 0.01 to 2 parts by weight of the said u.v. light stabiliser.

6. The composition according to claim 1, wherein the said extender compound is a compound selected from the group consisting of general formula (VI), (VII), (VIII) and (IX)

(VI)

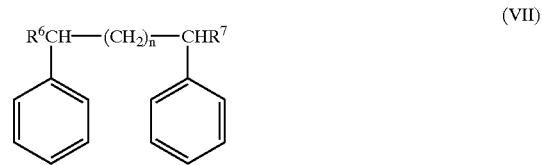

(VII)

(VIII)

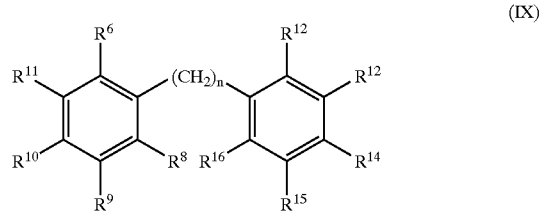

(IX)

where $R^6$ is an alkyl chain of from 1 to 30 carbon atoms, each of $R^7$ through to $R^{16}$ is independently selected from the group consisting of hydrogen, alkyl, alkenyl, alkynyl, halogen, haloalkyl, nitrile, amine, amide, ether and ester groups, and n is an integer of from 1 to 25.

7. The composition according to any one of claims 1 to 4 wherein the said extender is a compound of formula (X)

(X)

where $R^{17}$ is selected from the groups consisting of straight and branched chain alkyl group of from 1 to 25 carbon atoms, and $R^{18}$ and $R^{19}$ are independently selected from the group consisting of hydrogen and straight and branched chain alkyl groups of from 1 to 25 carbon atoms.

8. The composition according to claim 6 which comprises up to 70% w/w of the said extender.

9. The composition according to claim 1, wherein the said extender is a heavy alkylate, which has been recovered from the fraction remaining after distillation of oil.

10. The composition according to claim 9, which comprises from 20 to 25% w/w of the heavy alkylate extender.

11. The composition according to claim 1, wherein the said polymer has the general formula $$X-A-X^1 \quad (II)$$

where X and $X^1$ are independently selected from the group consisting of siloxane groups which terminate in hydroxyl and hydrolysable groups and A is a siloxane molecular chain.

12. The composition according to claim 1, wherein the said crosslinker is selected from the group consisting of silanes or siloxanes which contain silicon bonded hydrolysable groups.

13. The composition according to claim 12, wherein the said silicon bonded hydrolysable group is an acetoxy group.

14. The composition according to claim 13, wherein the said crosslinker is present in an amount of from 3 to 5% w/w.

15. The composition according to claim 1, which further comprises additional components selected form the group consisting of condensation catalysts, fillers and pigments.

16. The composition according to claim 1, which is substantially transparent.

17. The composition according to claim 1, which is room temperature vulcanisable.

18. A method of preparing a composition according to claim 1, which said method comprises mixing together a siloxane polymer having hydroxyl or hydrolysable groups and a crosslinker, and thereafter dispersing an extender and a stabiliser in the mixture.

19. A method of sealing a space between two units, said method comprising applying a composition according to claim 1, to the said space, and causing or allowing the said composition to cure.

20. A glazing structure or building unit which includes a sealant derived from a composition according to claim 1.

21. The composition according to claim 7 which comprises up to 70% w/w of the said extender.

* * * * *